May 9, 1939.   H. THÜRLINGS   2,157,192

SHEETING OF PLASTIC SUBSTANCES SUCH AS SUGAR CONFECTIONERY

Filed June 16, 1937

Patented May 9, 1939

2,157,192

UNITED STATES PATENT OFFICE 2,157,192

SHEETING OF PLASTIC SUBSTANCES SUCH AS SUGAR CONFECTIONERY

Hermann Thürlings, Viersen, Germany

Application June 16, 1937, Serial No. 148,610
In Germany June 18, 1936

6 Claims. (Cl. 107—12)

This invention relates to machines for rolling out or sheeting plastic material, such as high boiled sugar confectionery, whereby the material is rolled into a sheet or ribbon of desired thickness for feeding into high speed drop-roller machines for the manufacture of "drops".

An object of the invention is to provide an improved machine whereby it is possible in a single rolling operation to form the substance into a sheet or ribbon, without having to preform the batch by hand or mechanically in any way, so that the sheet or ribbon may be extruded at any desired speed while ensuring that sticking to the rolls will be prevented, particularly at low extrusion speeds.

The invention is particularly concerned with high boiled sugar confectionery and will be described by way of example as applied thereto.

According to the invention the ribbon or sheet of sugar is formed between sets of rollers, the individual rollers of which perform a rolling action on the sides of the sheet.

The invention comprises a machine for rolling or sheeting plastic substances such as sugar confectionery, wherein the rolling or sheeting surfaces are formed by a series of individual rotatable elements or rollers.

The invention also consists in a machine for rolling or sheeting plastic substances such as sugar confectionery comprising a pair of co-operating sheeting rollers, the surfaces of which are formed by a circumferential series of rollers.

Further features of the invention will be hereinafter described and defined in the claims.

In the accompanying drawing:—

Figure 1:
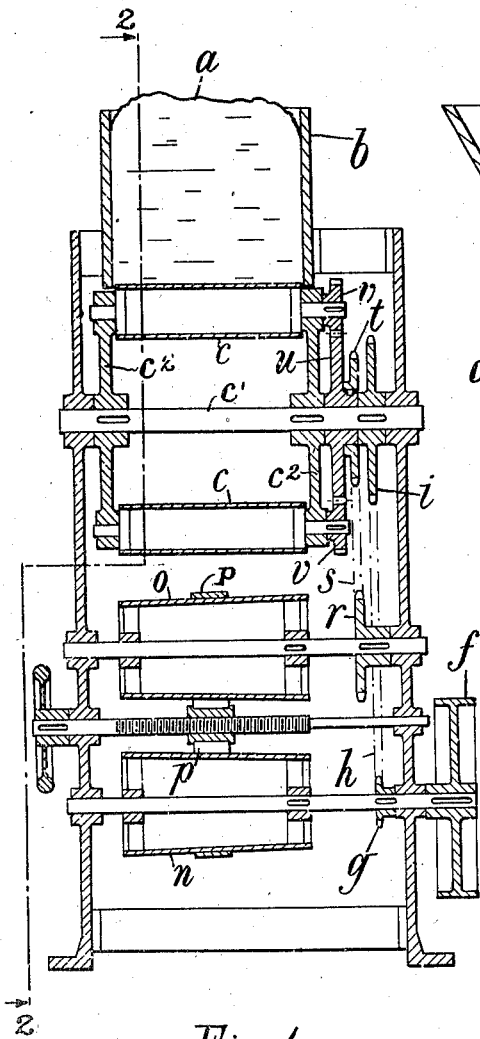
Figure 1 illustrates in cross section, taken on line 1—1 in Figure 2, a machine for forming a band or sheet of sugar confectionery according to the invention.
Figure 2:
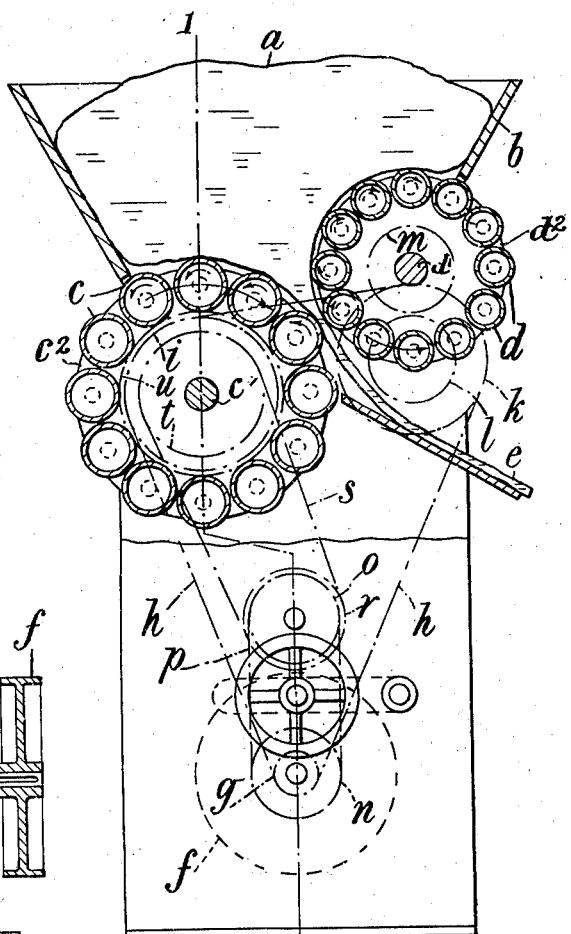
Figure 2 is a view taken on line 2—2 in Figure 1, the upper part being in section, while the lower part is in side elevation.

In carrying the invention into effect according to one convenient mode, a trough or hopper $b$ is provided under which a pair of rotating rolls or drums are mounted and which form the base of the hopper. These drums or rolls comprise two sets of rollers $c$ and $d$ which are mounted concentrically with respect to the axes of rotation $c'$ and $d'$ about which they move in orbital paths. The rollers $c$ are mounted to rotate upon their own axes and are carried in end disc elements $c^2$ fixed upon the shafts $c'$. The rollers $d$ are similarly journaled in end discs $d^2$ upon the shaft $d'$. The sets of rollers $c$ and $d$ are given orbital movements about the axes $c'$ and $d'$ by a drive from a sprocket $g$, consisting of a chain $h$ which passes over a sprocket $i$ fixed upon the shaft $c'$ and a sprocket $k$ which is geared by spur gears $l$ and $m$ to the shaft $d'$.

In addition to the orbital movement of the rollers $c$ each individual roller is adapted to be driven in such a manner that the rate of rotation may be regulated. For this purpose a variable speed gear comprising a pair of cone pulleys $n$ and $o$ is provided having an adjustable belt $p$. The cone pulley $n$ is mounted upon the same shaft as the sprocket $g$, which shaft is driven by a pulley $f$. The cone pulley $o$ is fixed upon a secondary shaft which carries a sprocket $r$ geared by the chain $s$ to a sprocket $t$ fixed upon a sun pinion $u$ which meshes with planet pinions $v$ keyed upon the spindles of the rollers $c$.

The rollers $d$ of the other set preferably run loose and receive their individual motions merely by contact with the material being sheeted as it passes between the sets of rollers. The rollers $d$ may however be individually driven similarly to the rollers $c$.

Each set of rollers is adapted to have an orbital movement in the direction of the long arrows while each individual roller also revolves in a direction of the small arrows. The rollers rotate in this manner beneath the batch of sugar and thus are only in contact with the sugar for a very short period whereby sticking is prevented.

At the highest speed of rotation of the individual rollers about their axes, the feeding by the orbital movement is neutralised so that no extruding of the sheet between the sets of rolls occurs. As the rotation of the individual rollers in relation to their orbital movement is decreased, the batch will be fed between the sets of rolls and extruded in the form of a band or sheet. It is found in practice that it is only necessary to provide a positive drive to the individual rollers of one set, the rollers of the other set receiving their individual rotation from contact with the extruding material.

The material $a$ being sheeted is delivered between the improved sheeting rolls in a ribbon or sheet $e$ which is delivered to the "drop" forming machine.

By means of the improved machine a ribbon or sheet of sugar is produced, the thickness of which may be adjusted so that the rollers of the "drop" forming machine receive just sufficient material for producing the "drops". Thus wear on the drop rollers is avoided and the drop forming machine can be operated at higher speeds than hitherto as forcing back of surplus material by the drop rollers is eliminated.

I claim:

1. A machine for rolling or sheeting a mass of plastic sticky material such as sugar confectionery comprising a plurality of convergently traveling rolling or sheeting surfaces consisting of a series of individual rotatable elements or rollers.

2. A machine for rolling or sheeting a mass of plastic sticky material such as sugar confectionery, comprising a pair of co-operating rotatable sheeting rolls the surfaces of which are formed by circumferential series of rollers.

3. A machine for rolling or sheeting plastic substances such as sugar confectionery, as claimed in claim 2, wherein adjustable means is provided for driving the individual rollers of a roll at a speed variable relatively to the rate of orbital rotation of said roll.

4. A machine for rolling or sheeting plastic substances such as sugar confectionery, comprising a pair of co-operating rotatable sheeting rolls the surfaces of which consist of circumferential series of rollers, and means for rotating the individual rollers of one sheeting roll, the rollers of the other roll running free about their axes and deriving their rotation through contact with the substance being sheeted.

5. A machine for rolling or sheeting plastic substances such as sugar confectionery, as claimed in claim 4, wherein the rollers of the positively driven roll are driven by means of a sun and planet gear through a variable speed gear.

6. A machine for rolling or sheeting plastic substances such as sugar confectionery, as claimed in claim 1, wherein the series of rotatable elements or rollers are located and arranged to constitute the bottom of a supply hopper for the substance being treated.

HERMANN THÜRLINGS.